United States Patent
Mangin

(10) Patent No.: US 11,271,772 B2
(45) Date of Patent: Mar. 8, 2022

(54) METHOD FOR TRANSMITTING DATA AND SYSTEM COMPRISING COMMUNICATING ENTITY

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/646,079

(22) PCT Filed: Aug. 17, 2018

(86) PCT No.: PCT/JP2018/031259
§ 371 (c)(1),
(2) Date: Mar. 10, 2020

(87) PCT Pub. No.: WO2019/082493
PCT Pub. Date: May 2, 2019

(65) Prior Publication Data
US 2020/0287743 A1    Sep. 10, 2020

(30) Foreign Application Priority Data
Oct. 26, 2017 (EP) .................................... 17306477

(51) Int. Cl.
*H04L 12/40* (2006.01)
*G06F 15/163* (2006.01)
(Continued)

(52) U.S. Cl.
CPC ...... *H04L 12/4015* (2013.01); *G06F 13/4213* (2013.01); *G06F 13/4247* (2013.01);
(Continued)

(58) Field of Classification Search
CPC .. G06F 13/42; G06F 13/4213; G06F 13/4247; G06F 15/16; G06F 15/163;
(Continued)

(56) References Cited

U.S. PATENT DOCUMENTS 5,012,468 A * 4/1991 Siegel ................. H04L 12/4035
370/454
6,005,869 A * 12/1999 Sakai .................. H04L 12/6418
370/452
(Continued)

OTHER PUBLICATIONS

Decotignie, "The Many Faces of Industrial Ethernet," IEEE Industrial Electronics Magazine, vol. 3, No. 1, Mar. 2009, pp. 8-19.
(Continued)

*Primary Examiner* — Stephen J Clawson
(74) *Attorney, Agent, or Firm* — Birch, Stewart, Kolasch & Birch, LLP

(57) ABSTRACT

A communicating entities include one master entity, configured for communicating according to a first protocol at least, and a plurality of slave entities. The slave entities include a first group of slave entities able to support communications according to said first protocol and unable to support communications according to a second protocol, and a second group of slave entities able to support communications according to at least said second protocol. The first protocol is implemented by a token passing with communication data from the master entity to successively each neighbour slave entity, until the token reaches again the master entity, defining thus a first cycle according to the first protocol. The second protocol is implemented by passing a data frame including data intended to entities of said second group, one current entity of said second group, when receiving said data frame.

13 Claims, 7 Drawing Sheets

(51) Int. Cl.
*G06F 13/42* (2006.01)
*G06F 15/16* (2006.01)
(52) U.S. Cl.
CPC ...... *G06F 15/163* (2013.01); *H04L 12/40019* (2013.01); *H04L 12/40065* (2013.01); *H04L 12/40091* (2013.01); *H04L 12/40195* (2013.01); *G06F 13/42* (2013.01); *G06F 15/16* (2013.01)
(58) Field of Classification Search
CPC ........... H04L 12/4014; H04L 12/40019; H04L 12/40065; H04L 12/40091; H04L 12/40195
See application file for complete search history.

(56) References Cited

U.S. PATENT DOCUMENTS

| | | | | |
|---|---|---|---|---|
| 7,447,931 | B1* | 11/2008 | Rischar | H04J 3/0697 368/46 |
| 8,559,300 | B2* | 10/2013 | Schulzte | H04L 12/437 370/223 |
| 10,628,361 | B2* | 4/2020 | Calvin | G06F 13/4282 |
| 2002/0110155 | A1* | 8/2002 | Pearce | H04L 12/423 370/519 |

OTHER PUBLICATIONS

Ganz et al., "Extending Summation-Frame Communication Systems for High Performance and Complex Automation Applications," IEEE Workshop on Factory Communication Systems, May 5, 2014, pp. 1-8.

* cited by examiner

METHOD FOR TRANSMITTING DATA AND SYSTEM COMPRISING COMMUNICATING ENTITY

TECHNICAL FIELD

The invention is related to data exchanges using optimized scheduling scheme. More particularly, the invention proposes a way of interleaving data exchanges according to both a first and a second cyclic Ethernet protocol, when for example the second protocol is an updated version (or a next generation) of the first protocol.

BACKGROUND ART

Before presenting the main principle of the invention, it is recalled hereafter the principle of operation of a usual cyclic Ethernet protocol (the "first" protocol as defined above), using for example the scheduling scheme specified in standard IEEE 802.1Qbv.

A typical usual cyclic Ethernet protocol network consists of a single control station (Master) and a plurality of slave stations (Slaves). The Medium Access Control is based on a token-passing scheme. Referring to FIG. 1, the Master M manages the network and starts the token passing sequence by sending the token to a first slave station S1 in the network. Reference TOK designates a situation where a slave entity becomes a token holder (successively S1, S3, S2, and back to M). The slave station S1 that receives the token performs its transmission, and then passes the token to the next station S2 in the sequence, and so on.

After the last slave station completes the process (reference S1 pointed by the return arrows of FIG. 1), it passes the token back to the Master M and the entire sequence is started again. The time needed to perform the whole token-passing sequence is fixed, constituting one cycle called hereafter "link scan" LS.

Of course, that Ethernet protocol uses standard Ethernet frames for data transfers. Three types of frames are usually defined, as shown in FIG. 2:
  Transmission Control Frames,
  Cyclic Transmission Frames, and
  Transient Transmission Frames.

A usual protocol generally includes three communication phases:

A. An initialization phase, used by the Master to establish the token-passing route, i.e. the sequence in which the slaves hold the token and during which:
  a. The Master discovers Slaves,
  b. The Master collects information about the Slaves,
  c. The Master distributes the Token Passing Route information,
  d. The Master distributes Parameters,
  e. The Master requests the Slaves to reflect the Parameters,
  f. The Master checks the Parameters reflected by the Slaves.

B. A Refresh Phase corresponding to the actual data exchange phase, during which:
  g. The Master starts a link scan by broadcasting data to all Slaves and addresses the token to a particular Slave,
  h. Each node (Slave) after receiving the Token, sends a Status Frame,
  i. Then sends Cyclic Frame(s),
  j. Then sends Acyclic Frame(s),
  k. Finally sends the Token Frame to the next Token holder.

C. A Return Phase where new nodes are detected and included in token passing scheme. The start of a Return Phase is decided by the Master.

The actual process data exchange takes place during the Refresh Phase. The size of the cyclic transmissions of each node is fixed during runtime, as shown in FIG. 3. The volume of acyclic frame per node is fixed during runtime as well. Referring to FIG. 3, after receiving the token, the slave device first sends its status frame, then one or more cyclic transmission frames, optionally followed by acyclic frames (for the so-called "transient communication"). The number of acyclic frames per node and cycle can be limited in order to avoid cycle time violations. Lastly, the node sends the Token Frame to the next token holder.

All Frames are broadcasted: nodes with two ports send all frames to both ports, and switches are used like hubs (making use of broadcast MAC addresses).

The protocol may distinguish different node types, which differ by maximum process data size as well as features such as support of acyclic communication. Among these are:
  "Remote Device Stations" which are limited to 128 bits of cyclic I/O data (plus register data) and do not support client functionality in acyclic communication;
  "Remote I/O stations" which are limited to 64 bits of cyclic I/O data (no register data) and do not support acyclic communication at all.

That type of cyclic Ethernet protocol can be used for example as industrial communication protocols dedicated to field communications, i.e. communications at the bottom of the control chain of a manufacturing assembly line that links the Programmable Logic Controller (PLCs) to the components that perform the actions, such as sensors, actuators, electric motors, console lights, switches, valves and contactors.

An example of that first usual cyclic Ethernet protocol can be the IEC reference 61158-4-23 (data link layer, type 23).

Possible evolutions of usual cyclic Ethernet protocols using typically the scheduling scheme specified in standard IEEE 802.1Qbv might lead to a next protocol generation where finally no token route needs to be established. Examples of such a next generation protocol can be SERCOS III, or else EtherCAT. Instead of dedicating an Ethernet frame for a single data exchanged between a source and a destination, that kind of "second cyclic Ethernet protocol" can concatenate multiple data in a single Ethernet frame. Typically, if a Master M has data to send to Slaves S1, S2 and S3, the three respective data sets are transported in the same frame, which is broadcasted to slaves S1, S2 and S3. Referring to FIG. 4A, each receiver (S1) then extracts, from the frame, data (M→S1) which are addressed to that Slave (S1), and relays a shorter packet to its neighbour (S2). In a symmetrical way, referring to FIG. 4B, a transmitter (S2) inserts, on the flight, its data (S2→M) into an existing frame that passes through it, or creates a new frame when required ("Header, S1→M, FCS", for Slave entity S1, in the example of FIGS. 4A and 4B).

Data exchanges in both directions, along a line, are still organized in cycles: within one cycle, a frame containing data exchanged between the Master and the slaves, whatever its direction, is transmitted from one end of the line to the other end.

In a line topology, transmission in upstream and downstream direction can be carried out simultaneously. FIGS. 4A and 4B illustrate indeed separately both downstream and upstream operations in a line arrangement with one Master M and three slaves S1, S2, S3.

This communication scheme can make a much more efficient use of the communication medium than previous protocols do and allow for shorter cycles (or equivalent "link scans").

However, multiplexing both first and second protocols by reserving time slots exclusively dedicated to each protocol would cause the cycles of the second protocol to be dependent on the link scan LS duration of the first protocol, which imposes then possible limits on the control loop performance of the second protocol.

The present invention aims to improve the situation.

SUMMARY OF INVENTION

The invention proposes to that end a method for transmitting data by hops between communicating entities, said communicating entities comprising:
one master entity, configured for communicating according to a first cyclic Ethernet protocol and according to a second cyclic Ethernet protocol, and
a plurality of slave entities, comprising:
  a first group of slave entities able to support communications according to said first protocol and unable to support communications according to said second protocol, and
  a second group of slave entities able to support communications according to at least said second protocol.

The first protocol is implemented by a token passing transmission with communication data from the master entity to successively each neighbour slave entity, until the token reaches again the master entity, defining thus a first cycle according to the first protocol (corresponding to a so-called "link scan" in an embodiment described in details below as for an example). More particularly, one current entity of the first group, when receiving an Ethernet data frame, is configured so as to:
  process said data frame and transmit the processed frame according to the token passing transmission, if the Ethernet data frame is according to the first protocol,
  or ignore the content of the data frame and simply transmit said data frame to a next neighbour entity upon its reception, if the Ethernet data frame is according to the second protocol.

The second protocol is implemented by passing an Ethernet data frame including data intended to entities of said second group (directly, without token), one current entity of the second group, when receiving said Ethernet data frame, being configured so as to:
  modify said data frame by taking from said data frame data intended to said current entity and/or by adding into said data frame data intended to other entities of said second group, and
  transmit the data frame thus modified to a neighbour entity, successively until the data frame reaches said current entity, defining thus a second cycle according to said second protocol.

Since these first and second protocols are cyclic, all of these entities can be connected in series, or in daisy chain, like in any network operating a usual cyclic Ethernet protocol.

More particularly, the master entity is configured to support communications according to both first and second protocols, and is configured further to:
  start the first cycle;
  start the second cycle, and chose in the second group at least one slave entity to start the second cycle at the same time as the master entity starts the second cycle.

In an embodiment, the chosen slave entity is the farthest from the master entity.

For example, that chosen entity can be defined as the farthest from the master entity according to a number of hops between entities to reach the master from that chosen entity. As an alternative example, it can be chosen according to measurement of the fading of a communication link with the master.

As presented above, entities of said first group are configured so as to ignore the content of the data frame according to the second protocol and simply transmit said data frame to a next neighbour entity upon its reception, and reversely in the same embodiment or in an alternative embodiment, entities of said second group are configured so as to ignore the content of the data frame according to the first protocol and simply transmit said data frame to a next neighbour entity upon its reception.

Therefore, each of said communicating entities may then comprise at least two communication ports, and can be configured to manage more particularly:
  one port for upstream communications, for receiving/transmitting to a neighbour entity a token according to said first protocol and/or a data frame according to said second protocol in a first direction towards the master entity, and
  one port for downstream communications, for receiving/transmitting to a neighbour entity a token according to said first protocol and/or a data frame according to said second protocol in a second direction opposite to said first direction.

In an embodiment, moments when:
  the master entity starts a new first cycle, and
  at the same time, the chosen slave entity of the second group starts a new second cycle,
are spaced in time by a third cycle, corresponding to the lowest common multiple of the first cycle and the second cycle.

All the communicating entities can be configured to apply for example an "IEEE 802.1Qbv" type communication protocol, the aforesaid third cycle corresponding thus to a cycle of said IEEE 802.1Qbv type protocol.

In an embodiment, each of said communicating entities can be configured to manage:
  a first traffic class queue for data transmission according to said second protocol (taking incoming data and relaying remaining data when the entity belongs to the second group, or simply relaying data when the entity belongs to the first group),
  a second traffic class queue for data transmission according to said first protocol (taking incoming data and relaying remaining data when the entity belongs to the first group, or possibly relaying data only when the entity belongs to the second group), and further
  a best effort traffic class queue for data to transmit when the communicating entity has no more transmissions according to said first and second protocols to perform.

A possible advantageous (but not limiting) application is industrial networks, where said communicating entities can be configured so as to operate in an industrial network.

The present invention aims also at a system comprising a plurality of communicating entities, where each entity, belonging to said first group or to said second group, comprises a logical circuit for performing a method according to the invention.

The present invention aims also at a communicating entity of that system, comprising a logical circuit for performing transmissions according to said first and second protocols, as a master entity.

The present invention aims also at a communicating entity of that system, belonging to said first group, and comprising thus a logical circuit for performing transmissions according to said first protocol and for ignoring a content of a data frame according to the second protocol and simply transmitting said data frame to a next neighbour entity upon reception of said data frame.

The present invention aims also at a communicating entity of that system, belonging to said second group, and comprising a logical circuit for performing transmissions according to said second protocol and for ignoring a content of a data frame according to the first protocol and simply transmitting said data frame to a next neighbour entity upon reception of said data frame.

The present invention aims also at a computer program, comprising instructions for performing the method according to the invention, when run by a processor. A general algorithm of that computer program can be illustrated by the chart flow of FIG. 9 described below.

The present invention is illustrated by way of example, and not by way of limitation, in the figures of the accompanying drawings, in which like reference numerals refer to similar elements.

DESCRIPTION OF EMBODIMENTS

The invention proposes a multiplexing scheme that avoids having to provision time slots reserved for communications according to a classical cyclic Ethernet protocol (aforesaid "first protocol"), and during which communications according to a possible next generation protocol (aforesaid "second protocol"), would remain "silent".

Figure 1:
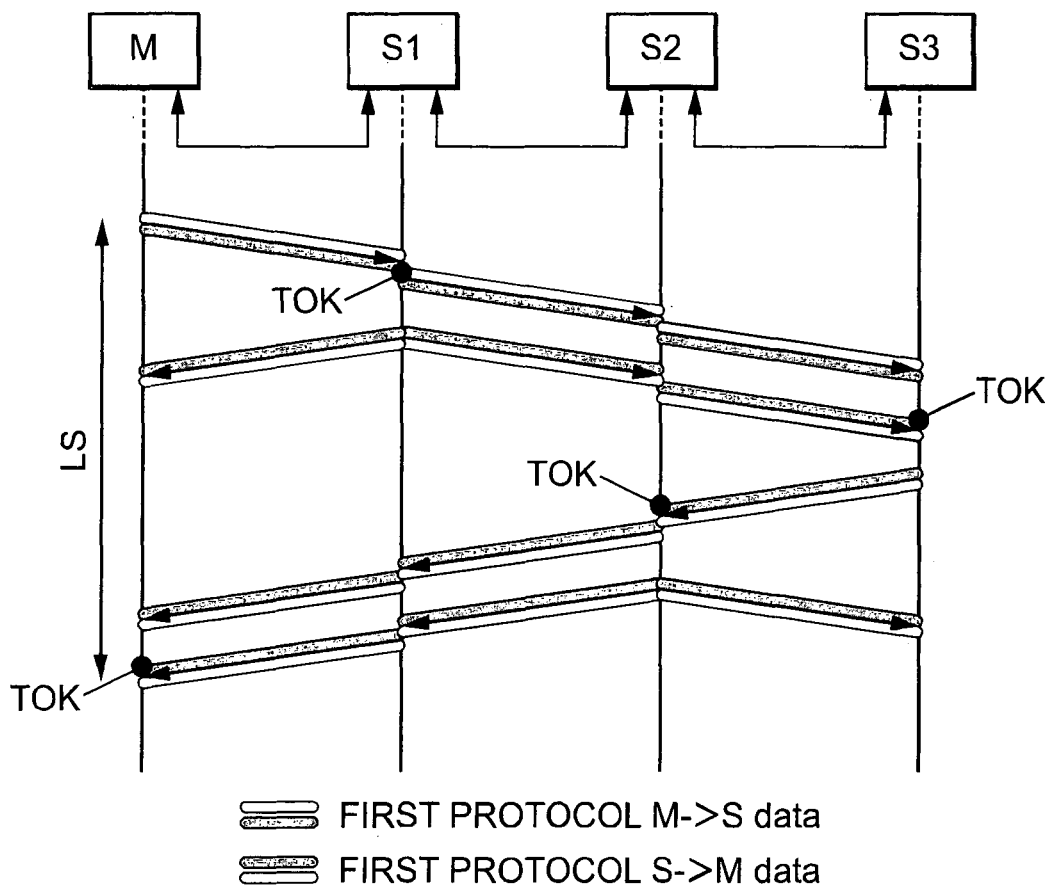
FIG. 1 shows schematically a communication principle according to a first type of cyclic Ethernet protocol.
Figure 2:
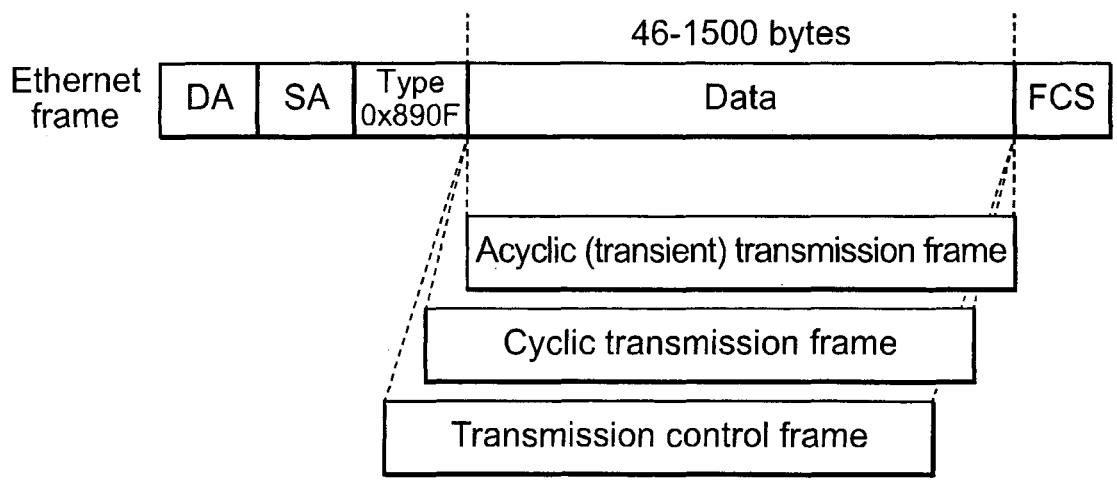
FIG. 2 shows schematically frame types of the protocol of FIG. 1.
Figure 3:
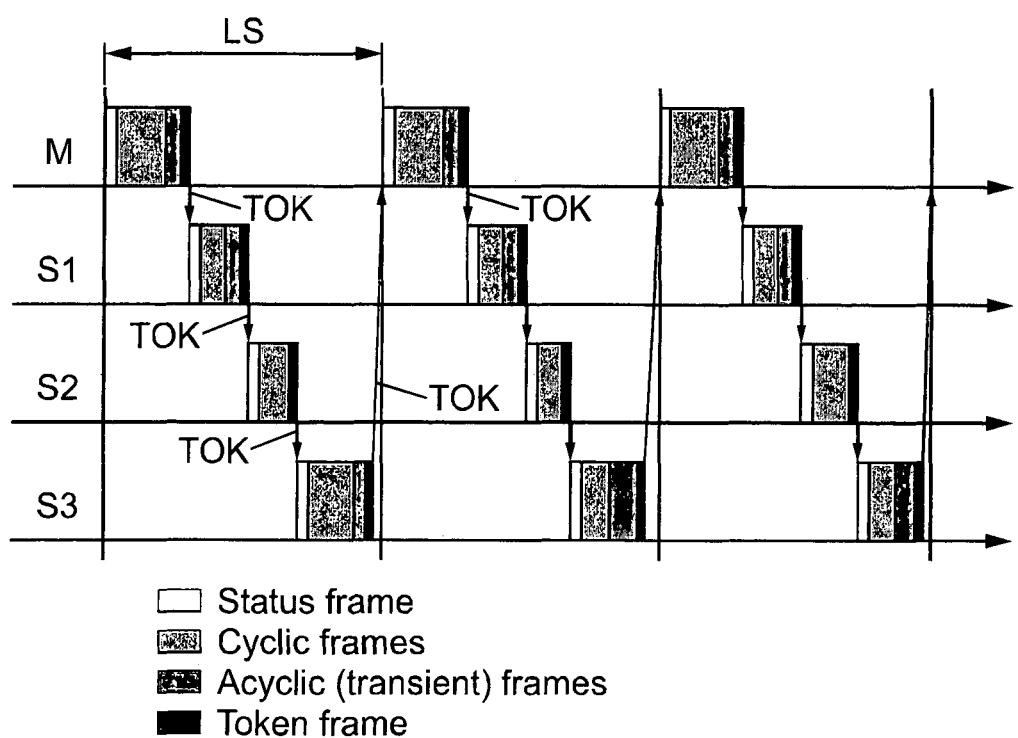
FIG. 3 shows schematically communication timelines according to the protocol of FIG. 1.
Figure 4A:
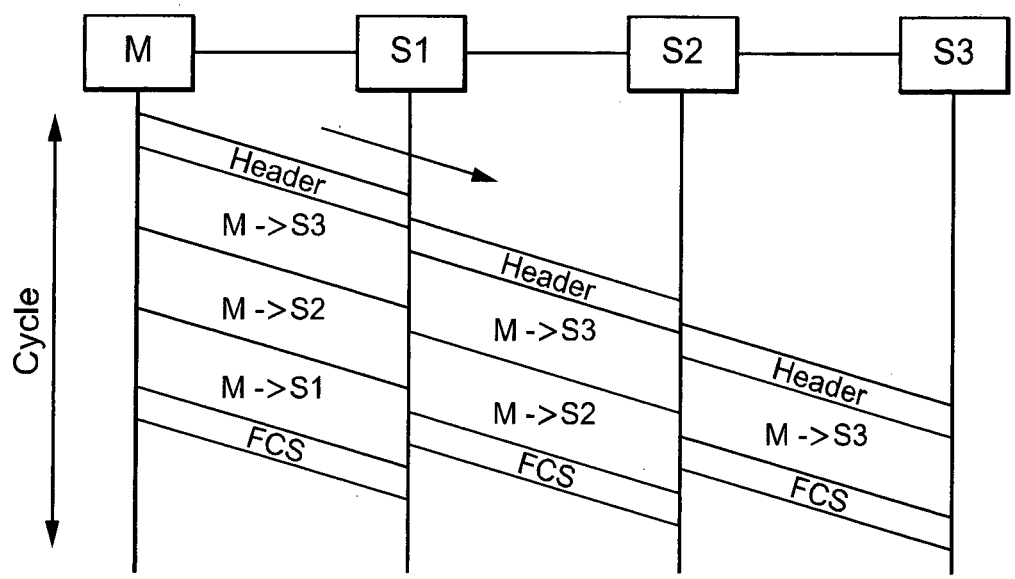
FIG. 4A shows schematically a communication principle according to a second cyclic Ethernet protocol.
Figure 4B:
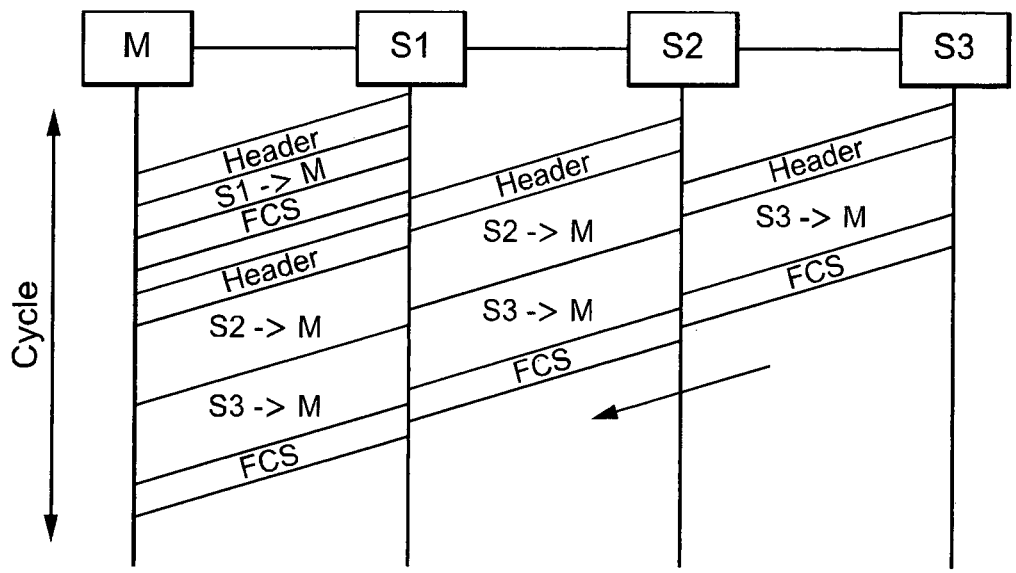
FIG. 4B shows schematically a communication principle according to a second cyclic Ethernet protocol.
Figure 5:
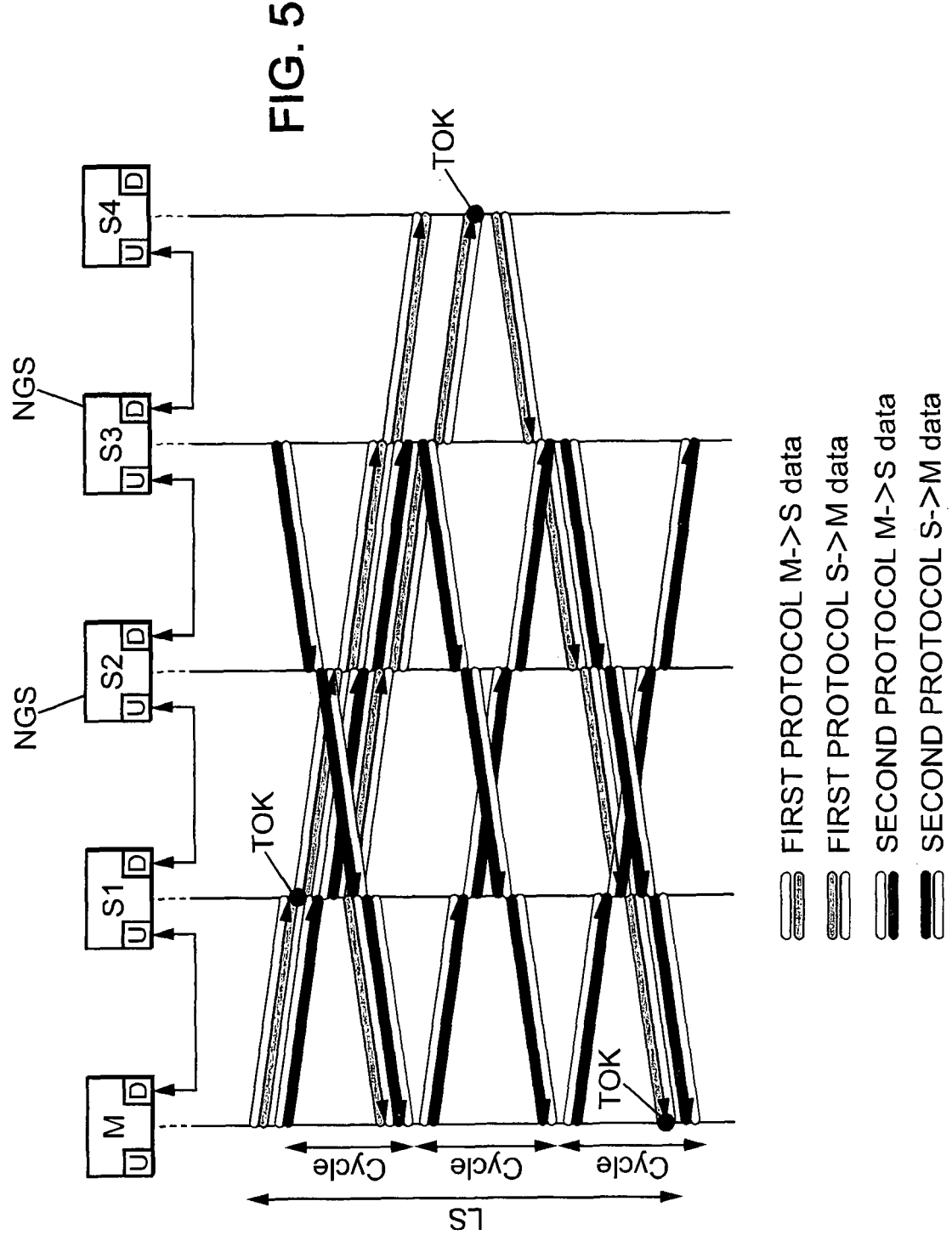
FIG. 5 shows schematically a communication principle according to the invention with a multiplexing of both first and second protocols.

As a main principle shown in FIG. 5, communications according to both first and second protocols are interleaved. More particularly, the cycles of the second protocol are included in the whole cycle link scan LS according to the first protocol.

Here, the master entity M can handle both the two protocols. Slave entities which can support the second protocol are referenced NGS: namely S2, and S3, while entities S1 and S4 can support only the first protocol.

The Master M starts the link scan according to the first protocol but sends both:
 a frame according to the first protocol, including a token TOK, and
 a frame according to the second protocol.

Since the slave entity S1 cannot support the new generation protocol in the example of FIG. 5, it simply ignores the frame received from the master M according to the second protocol, and transmits it to its neighbour S2, which will exploit this frame. However, the slave entity S1 gets the token TOK from the Master M in the frame according to first protocol, and exploits the content of that frame.

In the meantime when the Master entity M starts the link scan LS, the slave entity S3 which:
 is the farthest from the master M (for example according to a number of hops between them, or to a measurement of the fading of the communication link with the master M), and
 supports the new generation protocol (second protocol), starts also the communication according to the second protocol.

In a general way, the slave entities which do not support the communication according to the new generation protocol simply ignore the frames according to that new generation protocol and pass them to their neighbour. However, the other slave entities NGS can take in the frames according to the new generation protocol data which are intended to them, as shown in FIG. 5 in the arrow from entity S2 to entity S3.

The communication scheme shown in the example of FIG. 5 allows then for transparently keeping short the second protocol cycles while the first protocol link scan remains unchanged.

Figure 6:
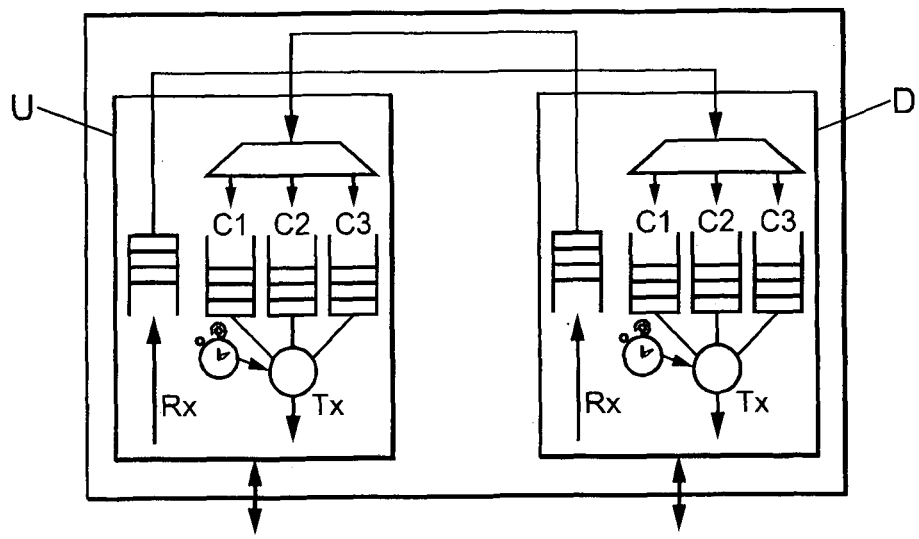
FIG. 6 shows schematically a two-port Ethernet switch with a scheduler according to an example of protocol according to IEEE 802.1Qbv specification.
Figure 7:
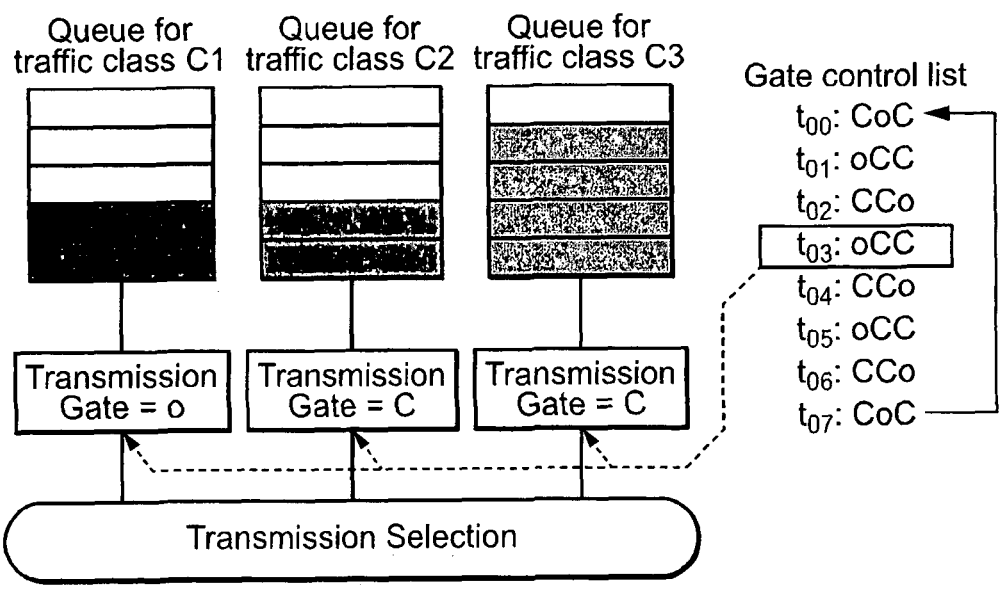
FIG. 7 shows schematically a 802.1Qbv transmission control implementation, in the context of the present invention.

More particularly, the assumption is made hereafter that all the entities participating in the mixed first and second protocol network are IEEE 802.1Qbv-capable. For the Qbv implementation in first protocol nodes, each node in the line can be considered as a two-port Ethernet switch with one upstream port U and one downstream port D. The details of each port are illustrated on FIG. 6. The transmit side Tx (and "Rx" for reception) of each port is controlled by a transmission selection scheme based on 802.1Qbv. FIG. 7 details the Qbv transmission control implementation with three classes of traffics C1, C2 and C3, that can respectively be used to map the second protocol, the first protocol and best effort transmissions. Each traffic class is associated to a Qbv transmission gate, which is controlled by the port's gate control list. The gate control list implements the time intervals dedicated to the transmission, over the port, of each traffic class data.

The depth (in time) of the gate control list corresponds finally to the Qbv cycle duration.

In this implementation, the time intervals where neither C1 (second protocol) traffic, neither C2 (first protocol) traffic, is transmitted over the port, are used to give transmission opportunities to C3 traffic (best effort).

To further optimize the use of the transmission resource allocated to C3 traffic, pre-emption and segmentation of C3 traffic can be implemented according to IEEE 802.1Qbu/802.3br.

Slots provided for class C3 traffic can comprise any type of communication data (TCP, UDP, etc.).

Figure 8:
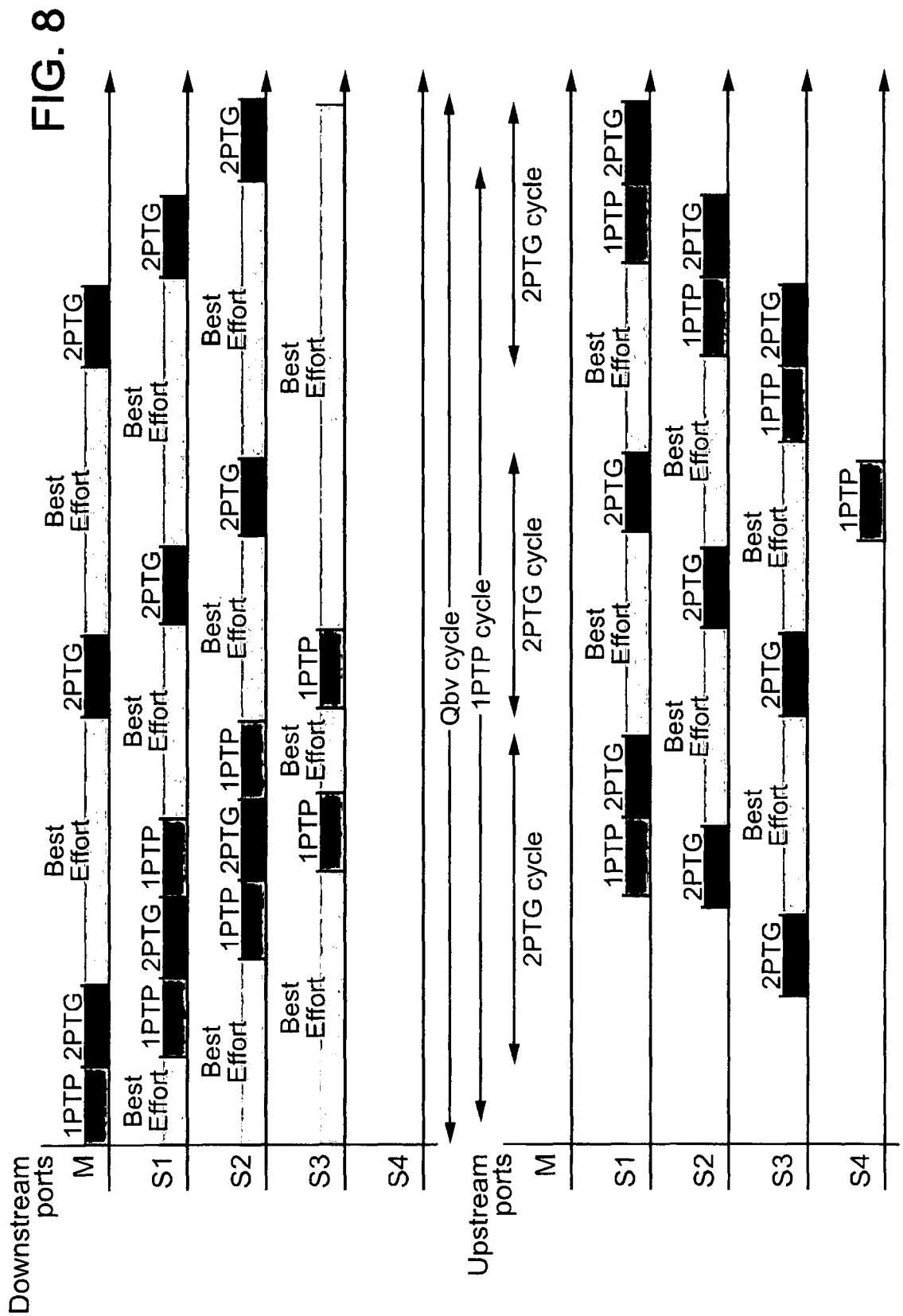
FIG. 8 shows schematically both first and second protocol mix communication timelines.

Regarding now the organisation of the IEEE 802.1Qbv schedule, the interleaving of the communications of both protocol types is established using an IEEE 802.1Qbv schedule that can be computed based on:
- The second protocol time-triggered cycle: called "2PTG cycle" in the present description and on FIG. 8,
- The first protocol token passing cycle: corresponding to the aforesaid Link scan, and called "1PTP cycle" hereafter and on FIG. 8.

In a first approximation, the 802.1Qbv cycle can be defined as the lowest common multiple of 2PTG cycle and 1PTP cycle.

Based on the communication mix example of FIG. 5, the timelines of FIG. 8 show the multiplexing of the three traffic classes according to gate control lists configured in each Upstream and Downstream port so that the communication pattern of FIG. 8 is obtained.

Figure 9:
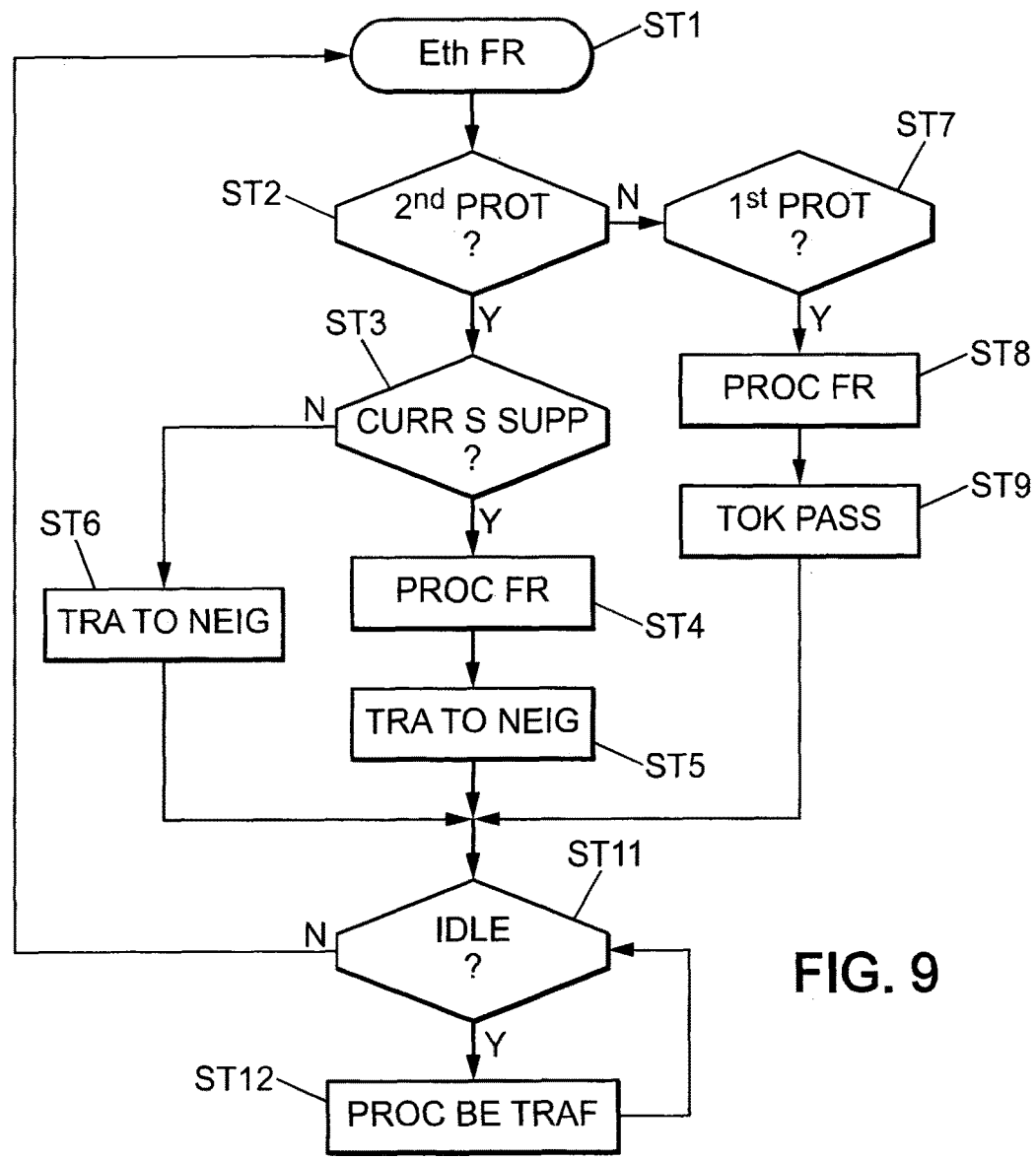
FIG. 9 shows steps which can be performed by a communication entity according to the invention.

Referring now to FIG. 9, upon reception of an Ethernet frame at step ST1 at a current slave entity, it is determined at step ST2 whether this Ethernet frame is a frame according to the second protocol (arrow Y) or not (arrow N). In the first case (Y), it is determined in step ST3 whether that current slave entity supports (arrow Y) or not (arrow N) the second protocol. In the first case (Y), the current slave entity can process the frame in step ST4 and then transmit the processed frame to its next neighbour in step ST5. Otherwise (arrow N from test ST3), the current slave entity simply transfers without any modification the frame according to the second protocol to its next neighbour in step ST6.

If the received Ethernet frame is not a frame according to the second protocol, but rather according to the first protocol (arrow Y from step ST7), the current slave entity can process then the frame in step ST8 and transmit the processed frame according to a token passing transmission in step ST9.

Once the frame(s) according to first and/or second protocol is (are) processed, a test ST11 is performed so as to determine whether the current slave entity is idle (arrow Y) or not (arrow N). In the first case (Y), best effort traffic class data can be processed in step ST12. Otherwise (arrow N from test ST11), if a new frame according to the first or the second protocol has been received and needs to be processed at first according to the transmission schedule control shown in FIG. 7, then the process returns to step ST1.

The invention provides then a mean to offer a performance-efficient transition and/or co-existence between current and future cyclic Ethernet protocols.

Figure 10:
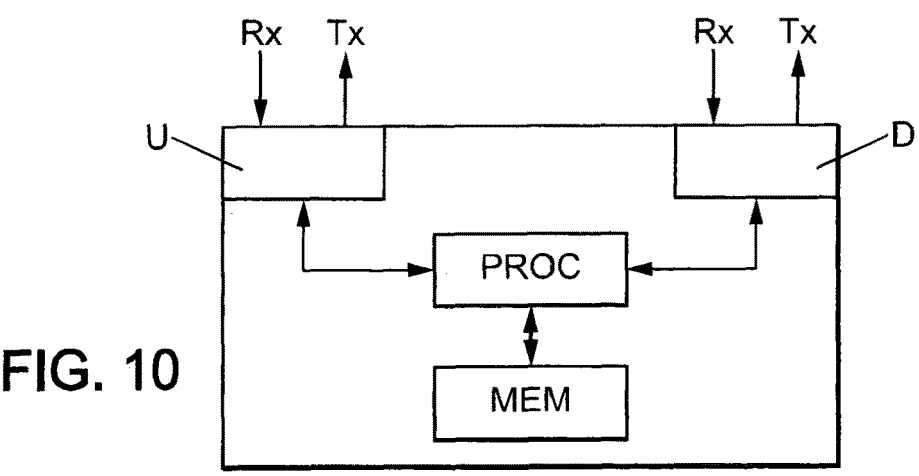
FIG. 10 shows schematically a communication entity according to an embodiment of the invention.

Referring now to FIG. 10, a communicating entity (master or slave) comprises:
- the two ports U for upstream communications and D for downstream communications, both for transmission Tx and reception Rx, connected to
- a logical circuit comprising a programmed ASIC or more generally any processor PROC cooperating with a memory MEM storing a computer program according to the present invention.

The present invention can be embedded thus in such a computer program product (an algorithm of which is described above with reference to FIG. 9), which comprises all the features enabling the implementation of the methods described herein, and which, when loaded in an information processing system (for example a set of communicating entities), causes the information processing system to carry out the invention. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, DVD or CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined below.

The invention claimed is:

1. A method for transmitting data by hops between communicating entities, said communicating entities comprising:
   one master entity, configured for communicating according to a first cyclic Ethernet protocol and according to a second cyclic Ethernet protocol, and
   a plurality of slave entities, comprising:
   a first group of slave entities able to support communications according to said first protocol and unable to support communications according to said second protocol, and
   a second group of slave entities able to support communications according to at least said second protocol,
   said first protocol being implemented by a token passing transmission with communication data from the master entity to successively each neighbour slave entity, until the token reaches again the master entity, defining thus a first cycle according to the first protocol, one current entity of said first group, when receiving an Ethernet data frame, being configured so as to:
   process said data frame and transmit the processed frame according to the token passing transmission, if said Ethernet data frame is according to the first protocol,
   or ignore the content of the data frame and simply transmit said data frame to a next neighbour entity upon its reception, if said Ethernet data frame is according to the second protocol,
   said second protocol being implemented by passing an Ethernet data frame including data intended to entities of said second group, one current entity of said second group, when receiving said Ethernet data frame, being configured so as to:

modify said data frame by taking from said data frame data intended to said current entity and/or by adding into said data frame data intended to other entities of said second group, and transmit the data frame thus modified to a neighbour entity, successively until the data frame reaches said current entity, defining thus a second cycle according to said second protocol, wherein said master entity is configured to support communications according to both first and second protocols, and is configured further to:

start the first cycle;

start the second cycle, and chose in the second group at least one slave entity to start the second cycle at the same time as the master entity starts the second cycle.

2. The method of claim 1, wherein the chosen slave entity is the farthest from the master entity.

3. The method according to claim 1, wherein entities of said second group are configured so as to ignore the content of the data frame according to the first protocol and simply transmit said data frame to a next neighbour entity upon its reception.

4. The method according to claim 1, wherein moments when:

the master entity starts a new first cycle, and at the same time, the chosen slave entity of the second group starts a new second cycle, are spaced in time by a third cycle, corresponding to the lowest common multiple of the first cycle and the second cycle.

5. The method according to claim 4, wherein all the communicating entities are configured to apply an "IEEE 802.1Qbv" type communication protocol, said third cycle corresponding to a cycle of said IEEE 802.1Qbv type protocol.

6. The method according to claim 1, wherein each of said communicating entities, comprising at least two communication ports, is configured to manage:

one port for upstream communications, for receiving/transmitting to a neighbour entity a token according to said first protocol and/or a data frame according to said second protocol in a first direction towards the master entity, and one port for downstream communications, for receiving/transmitting to a neighbour entity a token according to said first protocol and/or a data frame according to said second protocol in a second direction opposite to said first direction.

7. The method according to claim 1, wherein each of said communicating entities is configured to manage:

a first traffic class queue for data transmission according to said second protocol, a second traffic class queue for data transmission according to said first protocol, and a best effort traffic class queue for data to transmit when the communicating entity has no more transmissions according to said first and second protocols to perform.

8. The method according to claim 1, wherein said communicating entities are configured so as to operate in an industrial network.

9. A system comprising said master entity and said plurality of slave entities of claim 1, wherein said master entity and said plurality of slave entities each comprise a logical circuit for collectively performing a method according to claim 1.

10. The system according to claim 9, wherein the master entity comprises the logical circuit configured to perform transmissions according to said first and second protocols.

11. The system according to claim 9, wherein a slave entity belonging to said first group, and comprising the logical circuit for performing transmissions according to said first protocol and for ignoring a content of a data frame according to the second protocol and simply transmitting said data frame to a next neighbour entity upon reception of said data frame.

12. The system according to claim 9, wherein a slave entity belonging to said second group, and comprising the logical circuit for performing transmissions according to said second protocol and for ignoring a content of a data frame according to the first protocol and simply transmitting said data frame to a next neighbour entity upon reception of said data frame.

13. Non-transitory computer-readable media storing a computer program comprising instructions, in which each of said master entity of claim 1 and said plurality of slave entities of claim 1 has a processor and which, when executed by said processors, cause the processors to carry out the method as claimed in claim 1.

* * * * *